(12) United States Patent
Caccia et al.

(10) Patent No.: US 10,639,837 B2
(45) Date of Patent: May 5, 2020

(54) DEVICE AND METHOD FOR THE ADJUSTMENT OF THE THICKNESS PROFILE IN THE PRODUCTION OF BLOWN FILMS

(71) Applicant: SYNCRO S.R.L., Busto Arsizio (VA) (IT)

(72) Inventors: Gabriele Caccia, Busto Arsizio (IT); Paolo Rizzotti, Novara (IT); Enrico Nappa, Induno Olona (IT)

(73) Assignee: SYNCRO S.R.L., Busto Arsizio (VA) (IT)

( * ) Notice: Subject to any disclaimer, the term of this patent is extended or adjusted under 35 U.S.C. 154(b) by 650 days.

(21) Appl. No.: 15/028,792

(22) PCT Filed: Oct. 14, 2014

(86) PCT No.: PCT/IB2014/065302
§ 371 (c)(1),
(2) Date: Apr. 12, 2016

(87) PCT Pub. No.: WO2015/056173
PCT Pub. Date: Apr. 23, 2015

(65) Prior Publication Data
US 2016/0250792 A1 Sep. 1, 2016

(30) Foreign Application Priority Data
Oct. 15, 2013 (IT) .......................... MI2013A001702

(51) Int. Cl.
*B29C 48/08* (2019.01)
*B29C 48/92* (2019.01)
(Continued)

(52) U.S. Cl.
CPC .............. *B29C 48/08* (2019.02); *B29C 48/10* (2019.02); *B29C 48/2528* (2019.02);
(Continued)

(58) Field of Classification Search
CPC . B29C 47/0021; B29C 47/0026; B29C 55/28; B29C 47/92; B29C 47/8835;
(Continued)

(56) References Cited

U.S. PATENT DOCUMENTS

2014/0057010 A1 2/2014 Rubbelke

FOREIGN PATENT DOCUMENTS

EP 0524697 A2 1/1993
EP 0914928 A1 5/1999
(Continued)

OTHER PUBLICATIONS

International Search Report and Written Opinion for International Application No. PCT/IB2014/065302 (dated Feb. 16, 2015) (11 pages).

(Continued)

*Primary Examiner* — Robert J Grun
(74) *Attorney, Agent, or Firm* — Lucas & Mercanti, LLP

(57) ABSTRACT

A device arranged in the cooling ring of an apparatus for the production of blown films in order to adjust the thickness profile thereof is disclosed. The device includes a plurality of equally spaced motor-driven actuators that adjust the flow rate of the flow of a cooling fluid directed towards a forming cone, as well as a plurality of equally spaced resistances provided with finned dissipators arranged in the path of the cooling flow. In this way, the device combines the characteristics of low power consumption and high adjustment velocity of a volumetric device with the higher angular resolution achievable through the heating elements of a thermal device, and all of this with an operating method that prevents the risks of bubble instability or adhesion, achieves a high energy efficiency and guarantees a wide thickness adjustment range.

20 Claims, 4 Drawing Sheets

(51) Int. Cl.
  *B29C 55/28*  (2006.01)
  *B29C 48/25*  (2019.01)
  *B29C 48/88*  (2019.01)
  *B29C 48/10*  (2019.01)
  *B29L 7/00*  (2006.01)

(52) U.S. Cl.
  CPC ............ *B29C 48/913* (2019.02); *B29C 48/92* (2019.02); *B29C 55/28* (2013.01); *B29C 2948/926* (2019.02); *B29C 2948/92704* (2019.02); *B29C 2948/92971* (2019.02); *B29L 2007/008* (2013.01)

(58) Field of Classification Search
  CPC ...... B29C 47/0806; B29C 2947/92971; B29C 2947/92704; B29C 2947/926
  See application file for complete search history.

(56) References Cited

FOREIGN PATENT DOCUMENTS

| | | |
|---|---|---|
| EP | 1982819 A2 | 10/2008 |
| JP | H05104623 A | 4/1993 |
| WO | 2012080276 A2 | 6/2012 |

OTHER PUBLICATIONS

International Preliminary Report on Patentability for International Application No. PCT/IB2014/065302 (dated Jan. 27, 2016) (15 pages).
Response to Written Opinion issued for International Application No. PCT/IB2014/065302.

DEVICE AND METHOD FOR THE ADJUSTMENT OF THE THICKNESS PROFILE IN THE PRODUCTION OF BLOWN FILMS

CROSS-REFERENCE TO RELATED APPLICATIONS

This application is a 371 of PCT/IB2014/065302, filed Oct. 14, 2014, which claims the benefit of Italian Patent Application No. MI2013A001702, filed Oct. 15, 2013.

BACKGROUND OF THE INVENTION

The present invention relates to plants for the production of blown films, i.e. plastic films extruded in bubble shape, and in particular to a device and a relevant method for adjusting the thickness profile of the film. Prior art devices that provide said adjustment operate essentially in two ways, namely through heating elements that increase the temperature of the molten plastic material close to the die lip or of the flow of cooling fluid, typically air, or through actuators that adjust the flow rate of the flow.

In the first type of device the heating elements can be arranged in the extrusion head die and/or in the cooling ring, while in the second type of device the actuators can be arranged in the cooling ring or in a dedicated adjustment ring connected to the cooling ring or independent therefrom (typically interposed between the extrusion head and the cooling ring). Each known arrangement has drawbacks that limit its effectiveness and range of application.

When the heating elements are arranged in the extrusion head die, in a discrete number evenly distributed along the perimeter, a first drawback stems from the temperature increase in the die lip that can result in a degradation of the plastic material due to exposure to an excessive temperature for a significant time, consequently altering the optical and mechanical properties of the film. Moreover, the deposition of degraded material on the sliding surface of the die requires frequent downtimes to perform the cleaning of the extrusion lip with costly inefficiencies and rejects.

A second drawback consists in the fact that the device operates in a satisfying way in the case of angularly extended and distributed corrections but does not lend itself to point corrections of small angular extension since the metal of the die is thermally conductive and this prevents from obtaining significant temperature gradients in adjacent regions of the die. Furthermore, the adjustment is slow due to the high thermal inertia that opposes the temperature change of a body of solid metal.

A further limit is given by the unidirectional adjustment of the thickness towards smaller values since only a positive variation of the temperature with respect to a reference temperature is available, whereas a symmetrical system of die cooling that produces a negative variation of the temperature is not available.

It is possible to obtain an adjustment device that is quicker, more precise and effective by arranging the heating elements in the cooling ring since the temperature change of the heating elements and of possible radiating bodies connected thereto is quicker in that the masses of the bodies to be heated are smaller than the die mass. Moreover, by arranging the heating elements in the ring cooling flow it is possible to achieve a cooling of the heating elements in a comparatively quicker way with respect to similar heating elements arranged in the metal of a die.

Therefore it is a common practice to set a film reference temperature (so-called "set point") by keeping all the heating elements turned on at a fraction of their maximum power, indicatively 15-25%, in order to allow for temperature corrections both positive, through an increased heating of the air flowing in the ring, and negative through a decreased heating of the air thus resulting in an increased film cooling. In this way it will be possible to perform corrections of the circumferential profile of the film either by increasing its thickness (lower heating) in the case of regions below the average value, or decreasing it (higher heating) where a thickness higher than the average value is detected.

Such a device allows therefore a bidirectional adjustment of the thickness but has the serious drawback of implying a significant energy waste and a low efficiency. In fact, the air flowing in the ring that is used to cool the bubble usually comes from suitable cooling plants that lower its temperature so as to increase the cooling effectiveness to maximize the hourly output of the line, although it might also be cooled directly in the ring as shown in JP 05104623. Imposing a base heating, in order to allow the bidirectional thickness adjustment, to the previously cooled air leads therefore to a high power consumption both for the cooling and the subsequent partial heating of the air, which results in a poor energy efficiency.

It should also be considered that the heating elements in the cooling ring are present in a number greater than those that can be arranged in the extrusion die, for the same die diameter, and this allows to control a greater number of adjustment points along the perimeter. By way of example, considering a typical device with a hundred heating elements having a maximum power of 200 W each that are set at 20% to obtain the reference temperature, the basic hourly consumption of the device is equal to 4 kWh and the maximum theoretical hourly consumption is equal to 20 kWh.

In the second type of device the thickness adjustment is based on the change in the flow rate of the cooling air, said change being also possibly used to adjust the Venturi effect that keeps the film close to the cooling ring as shown in EP 0914928. Through motorized shutters or valves it is possible to modify the thermal cooling exchange between air and film. The advantages of this type of device are a higher adjustment velocity, the bidirectional adjustment and a negligible consumption due only to the activation of the actuators. On the other hand, the size of the actuators results in general in the possibility of installing only a lower number of adjustment points with respect to the above-described arrangement of the heating elements in the cooling ring.

Another drawback of this solution is the risk of compromising the stability of the bubble when the flow rate of the cooling flow is greatly increased/decreased in order to increase/decrease the film thickness up to the ends of the possible adjustment range. In fact, the air flowing on the inside and on the outside of the bubble forming cone not only affects the cooling capacity of the device but is also responsible for the pressure conditions on the ring inserts that determine the constancy of the fluid passage and the attractive force between the parts.

Changing the air flow rate implies changing also the flow thickness and the attractive force of the bubble on the forming cone, whereby when increasing the distance between the ring and the bubble the latter can be less guided and less stable thus jeopardizing the effectiveness of the adjustment itself and sometimes the stability of the entire process. On the other hand, an excessive decrease in the flow thickness implies the risk of contacts between the film and the forming cone with resulting surface alterations of the film characteristics and possible breaking of the bubble itself.

As a consequence, if the reference flow is set at a flow rate of the cooling air such that at the minimum flow rate there is no adhesion of the film to the forming cone, there is the risk that bubble instability occurs at the maximum flow rate. Vice versa, if the reference flow is set at a flow rate of the cooling air such that at the maximum flow rate there is no bubble instability, there is the risk that adhesion of the film to the forming cone occurs at the minimum flow rate. On the other hand, limiting the change in the flow rate in order to prevent both the adhesion risk and the instability risk would result in a thickness adjustment range that is too narrow.

In case the actuators are arranged in a dedicated adjustment ring, as mentioned above, the air used for the thickness adjustment may come from a suitable flow generator such as a fan or a compressor, or it may be a partial flow derived from the same circuit of the cooling ring. It should finally be noted that cooling rings usually provide one or more flow splits, with the cooling flow that is typically split into a bottom flow and a top flow respectively flowing on the inside from the bottom edge of the forming cone and on the outside thereof, converging at the cone top edge. It is clear that the above-illustrated principles of thermal or volumetric adjustment remain unchanged regardless of the fact that they are applied to the total flow to a partial flow.

Descriptions of these film thickness adjustment systems can be found in various documents, for example EP 0524697 describes a cooling device for extrusion heads that in a first embodiment is provided with means for the adjustment of the flow rate of the cooling air flow and in a second embodiment is provided with means for the adjustment of the temperature of said flow. EP 1982819 discloses a similar cooling device that in addition to said two embodiments also provides a third embodiment obtained by combining the first two, i.e. with two cooling rings that adjust two distinct air flows according to the thermal and volumetric modes respectively.

WO 2012/080276 discloses a cooling device that is different from the above-mentioned devices in that the thermal and volumetric adjustments are carried out simultaneously and in combination, since the former automatically controls the latter. More specifically, the adjusting element consists of a radial heating element and a bimetallic element that extends thereon and is secured thereto at one end whereas the other end remains free, whereby the bimetallic element acts as a flow adjustment valve by restricting the air passage cross-sectional area when it is heated. In this way, the increase in air temperature also implies a decrease in the flow (and therefore a decrease in the film thickness) and vice versa the decrease in air temperature also implies an increase in the flow (and therefore a increase in the film thickness) since the two adjustment modes are combined in the same direction.

Such an arrangement makes the adjustment system quicker yet also less sensitive and more limited as adjustment range, since the combination of the two thermal and volumetric adjustments does not leave room for further interventions.

SUMMARY OF THE INVENTION

Therefore the object of the present invention is to provide an adjustment device and method which overcome the above-mentioned drawbacks. This object is achieved by means of a device of volumetric type yet characterized by the presence of both actuators for the adjustment of the flow rate of the flow and heating elements for the adjustment of the temperature of the flow arranged sequentially, as well as by means of the relevant operating method. Further advantageous features of the present device are disclosed in the dependent claims.

The main advantage of this device is that of retaining the characteristics of low power consumption and high adjustment velocity of a volumetric device while combining them with the higher angular resolution achievable through the heating elements of a thermal device. Furthermore, this combination allows for an operating method that prevents the risks of bubble instability or adhesion, achieves a high energy efficiency and guarantees a wide thickness adjustment range, even wider than any prior art device.

In fact such a device can be set so that the reference temperature corresponds to a flow rate of the cooling air such that at the maximum flow rate there is no bubble instability, while the risk of adhesion of the film to the forming cone at the minimum flow rate is eliminated by increasing the minimum flow rate. Yet, limiting the flow rate decrease in order to prevent the adhesion risk does not result in a too narrow thickness adjustment range because the range portion not covered by the flow rate adjustment of the flow is covered by the temperature adjustment of the flow through the heating elements that can also provide an adjustment more to the point since they are preferably present in a number greater than the actuators that adjust the flow rate.

Therefore the correction of base, wide bands, eccentricity errors and the like is carried out by the actuators that adjust the flow rate of the flow, without said action being able to cause bubble instability or adhesion phenomena, while the intervention of the thermal control allows to extend and refine the thickness adjustment without resulting in a significant power consumption. In fact, the heating elements operate in a unidirectional way and only when it is necessary to reach thickness values below the thickness corresponding to the minimum flow rate and/or a higher angular resolution, in case they are greater in number than the actuators.

Another advantage of this device stems from the fact that it is made with conventional, simple and inexpensive components that in some instances could also be installed in existing plants as after-market upgrade.

BRIEF DESCRIPTION OF THE DRAWINGS

Further advantages and characteristics of the device and method according to the present invention will be clear to those skilled in the art from the following detailed and non-limiting description of two embodiments thereof, with reference to the annexed drawings wherein.

DETAILED DESCRIPTION OF THE INVENTION

Figure 1:
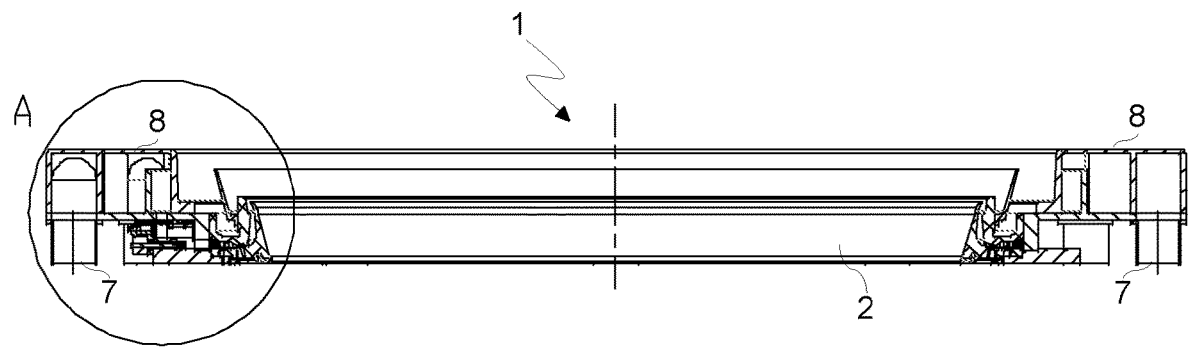
FIG. 1 shows a view in diametral cross-section of a first embodiment of the device arranged in a cooling ring.
Figure 2:
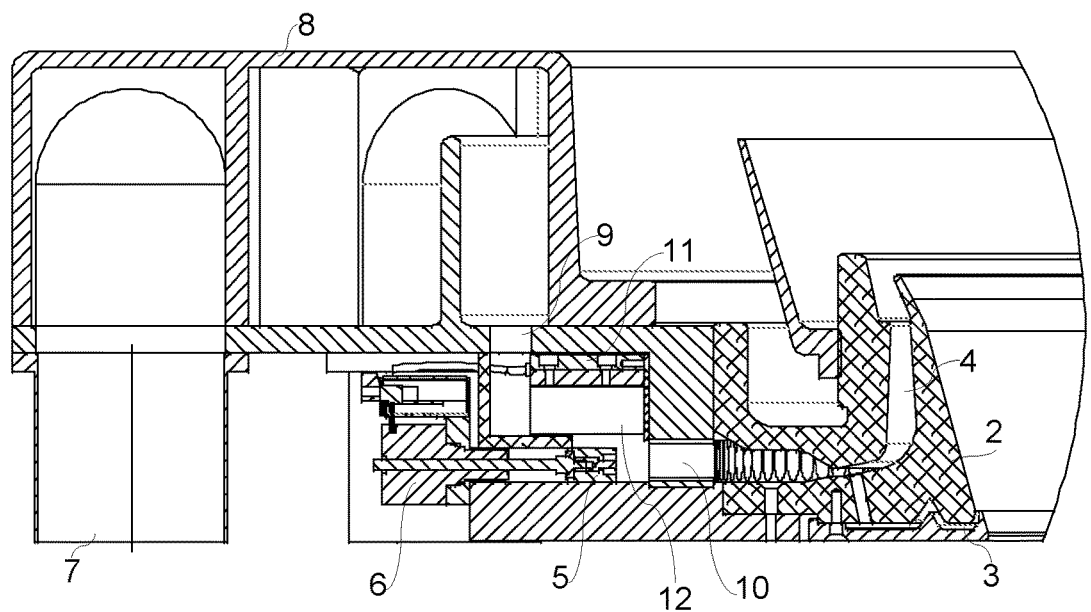
FIG. 2 is an enlarged view of detail A of FIG. 1, with the shutter in the position of maximum closure corresponding to the minimum air flow rate.
Figure 3:
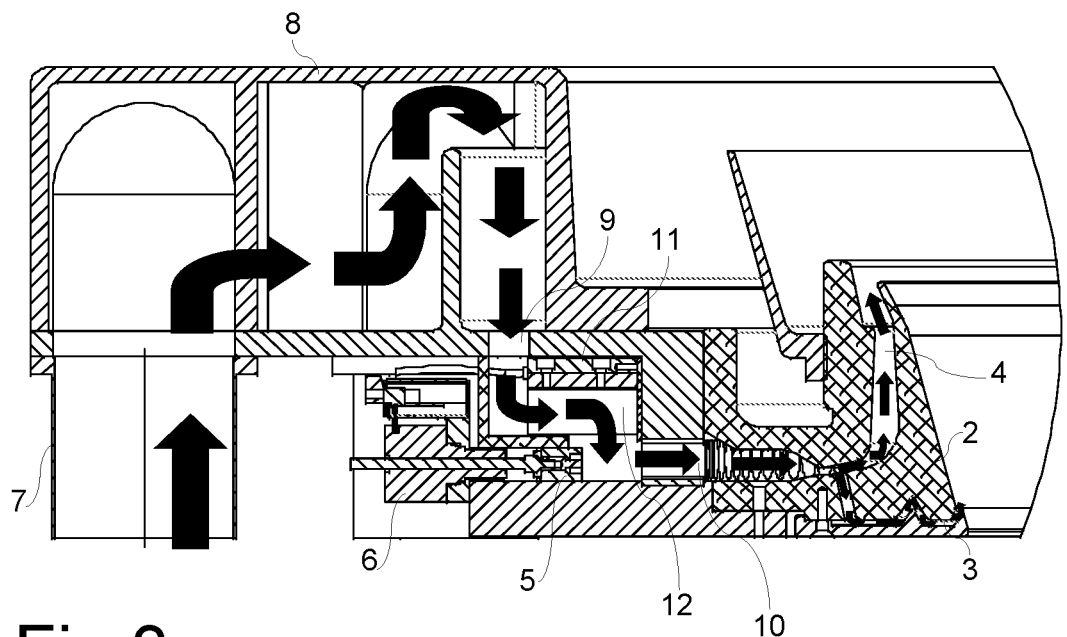
FIG. 3 is a view similar to the preceding one with the shutter in the position of maximum opening corresponding to the maximum air flow rate, and a series of arrows that indicate the flow path.
Figure 4:
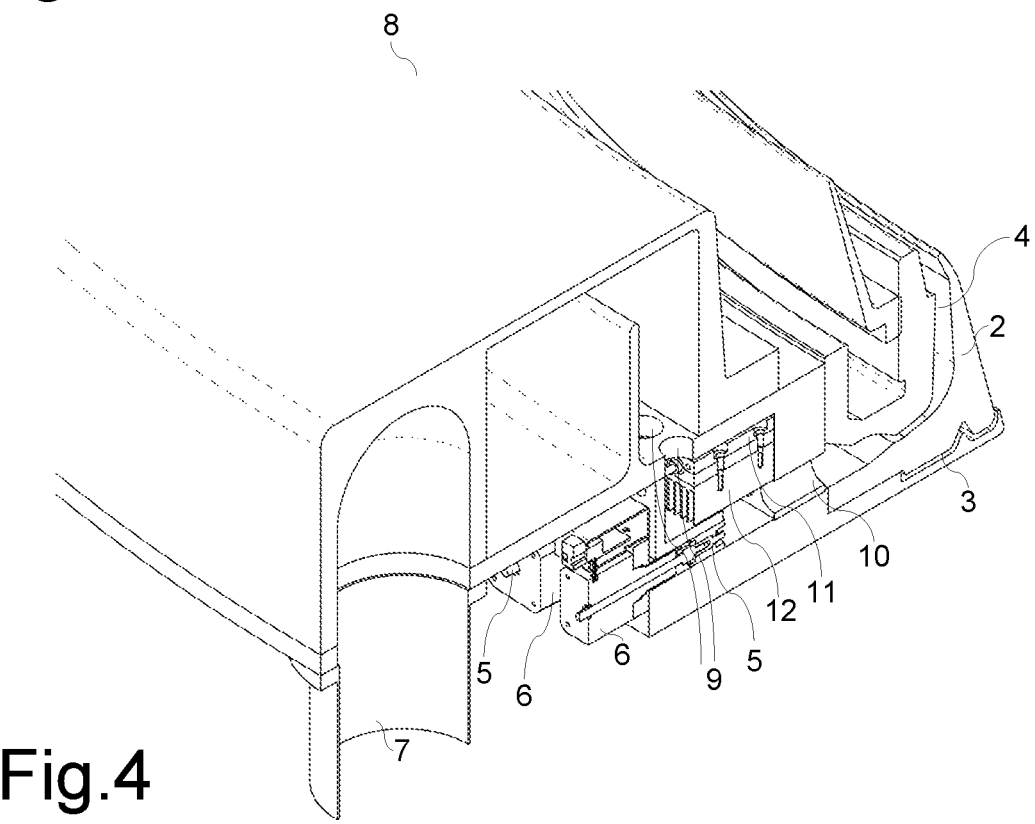
FIG. 4 is a perspective view of the section of FIG. 3 but showing a pair of actuators in accordance with the invention.

Referring to FIGS. 1 to 4, there is illustrated a first embodiment of the device arranged in a cooling ring 1.

The cooling ring 1 is fed through a plurality of ducts 7 that introduce air into a labyrinth 8, suitable to reduce the flow turbulence; at the end of labyrinth 8 a ring of holes 9 lets the air through to an adjustment chamber where shutter 5 limits the passage towards a channel 10 that then bifurcates into bottom channel 3 and top channel 4. In this way there is obtained a bottom flow and a top flow (FIG. 3) respectively on the inside and on the outside of the forming cone 2, with the bottom flow that from the bottom edge of the forming cone 2 rises towards the top edge where it encounters the top flow.

The cooling flow is adjusted through a series of horizontal sliding shutters 5 (two visible in FIG. 4) equally spaced along ring 1; said shutters 5 partialize the flow passage cross-sectional area by moving radially under the action of electric motors 6, preferably stepping motors, that adjust their position.

It should be noted that in other non-illustrated embodiments the shutters might be vertical and move parallel to the ring axis or they might be arranged along inclinations intermediate between horizontal and vertical.

The novel aspect of the device according to the present invention resides in the addition to this conventional volumetric device of a plurality of heating elements, preferably cartridge resistances 11 provided with finned dissipators 12, arranged in the path of the cooling flow so as to increase the temperature thereof and also equally spaced along ring 1. The heating elements may also be present in a number different with respect to shutters 5, for example twice as much so as to double the number of adjustment points and therefore the angular resolution of the device.

More specifically, in this first embodiment of the device resistance 11 is arranged in the adjustment chamber upstream from the position of adjustment of the flow rate of the flow, namely between hole 9 and shutter 5, whereby the canalized flow first encounters the finned dissipator 12 and then the motor driven shutter 5.

Figure 5:
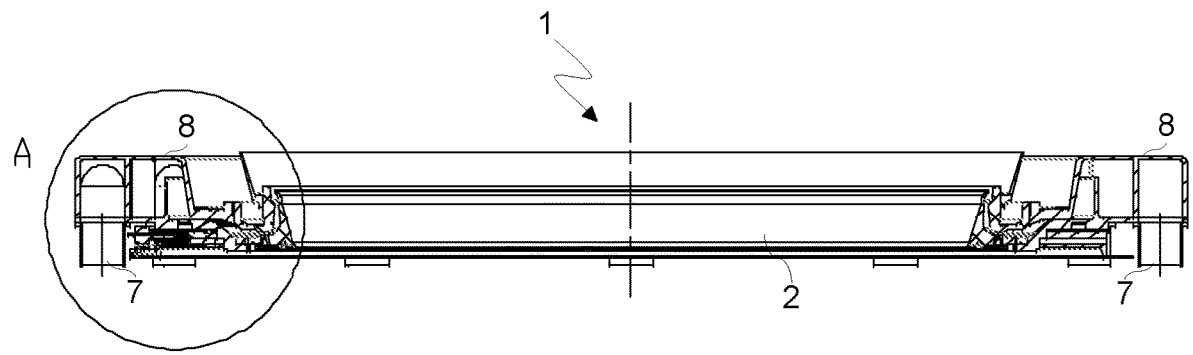
FIG. 5 shows a view in diametral cross-section of a second embodiment of the device arranged in a cooling ring.
Figure 6:
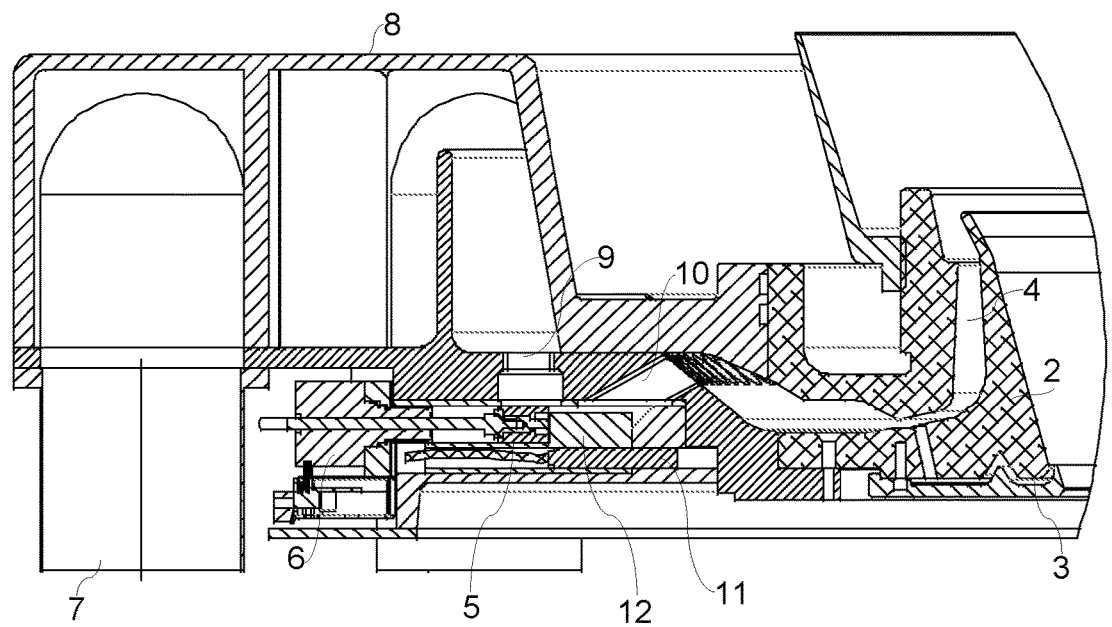
FIG. 6 is an enlarged view of detail A of FIG. 5, with the shutter in the position of maximum closure corresponding to the minimum air flow rate.
Figure 7:
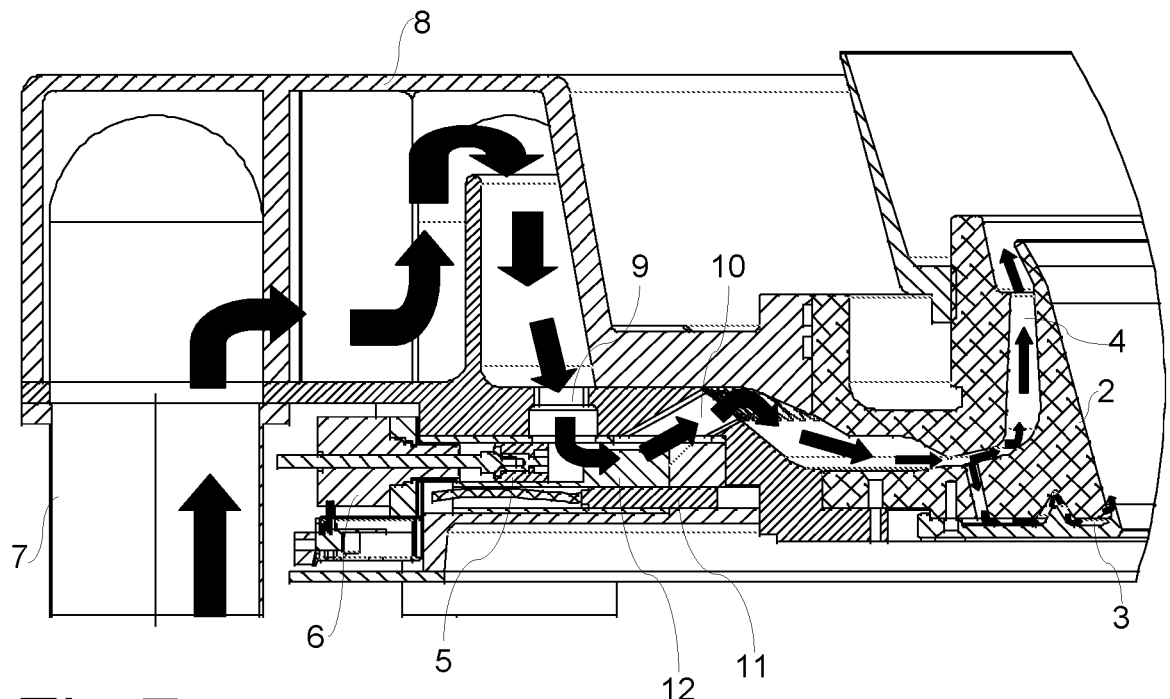
FIG. 7 is a view similar to the preceding one with the shutter in the position of maximum opening corresponding to the maximum air flow rate, and a series of arrows that indicate the flow path.
Figure 8:
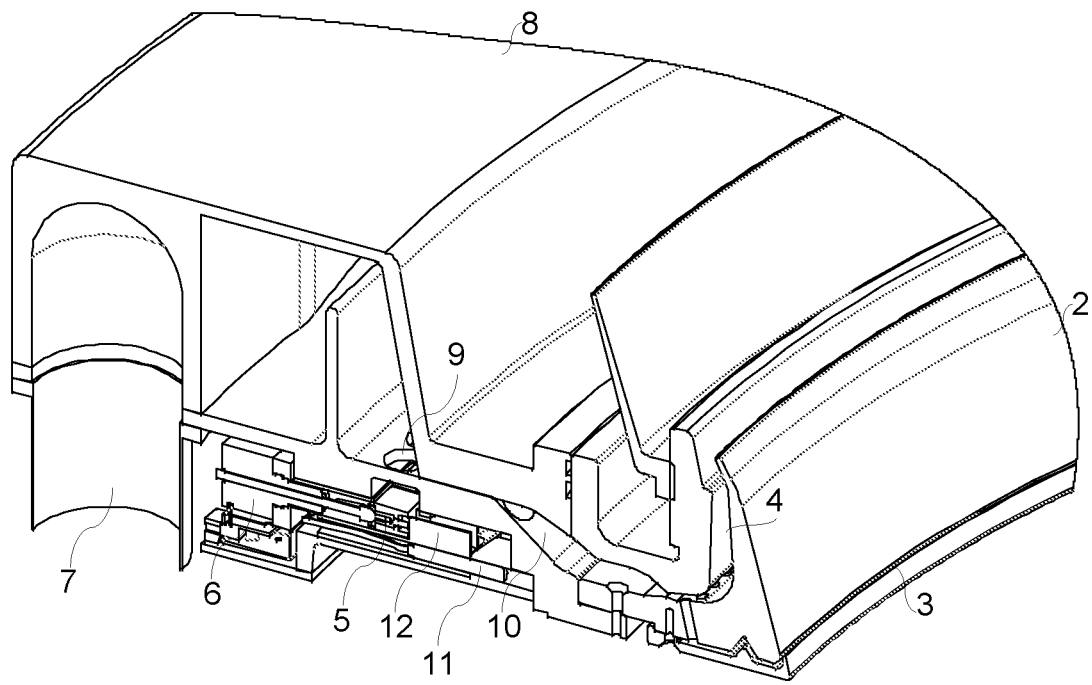
FIG. 8 is a perspective view of the section of FIG. 6.

Vice versa in the second embodiment illustrated in FIGS. 5 to 8, where the same reference numerals indicate the same components, the order of the adjustment means in the chamber is reversed in that resistance 11 is arranged between shutter 5 and channel 10. Therefore in this case the cooling flow is first partialized by the motor-driven shutter 5 and then encounters the finned dissipator 12.

The method for the adjustment of the thickness profile that is carried out with a device according to the present invention may therefore be summarized in the following steps:

a) arranging a device for the adjustment of the flow rate of the cooling flow also provided with heating elements located in the path of the cooling flow and sequentially arranged with said device;

b) setting the range of the flow rate adjustment of the flow of said device so that the reference temperature of the film corresponds to a flow rate of the cooling flow such that at the maximum flow rate there is no bubble instability and at the minimum flow rate there is no adhesion of the film to the forming cone;

c) adjusting the thickness profile of the film, on the basis of the values detected by suitable sensors, by changing the flow rate of the cooling flow within the adjustment range set in the previous step;

d) increasing the flow temperature by means of the heating elements in order to reduce the film thickness in case it must reach values below the thickness corresponding to the minimum flow rate of the cooling flow.

In case the number of heating elements arranged in step a) is greater than the number of actuators that adjust the flow rate of the flow, step d) can be carried out also in case of need of a higher adjustment resolution.

It is clear that the above-described and illustrated embodiments of the device according to the invention are just examples susceptible of various modifications. In particular, shutters 5 can be replaced with other mechanically equivalent motor-driven actuators (e.g. valves) and the cartridge resistances 11 with finned dissipators 12 can be replaced with other types of heating elements, as long as the replacing components are suitable to provide the required adjustment precision.

The invention claimed is:

1. Device arranged in the cooling ring of an apparatus for the production of blown films in order to adjust the thickness profile of said films, said device comprising:
    a plurality of actuators equally spaced around said ring and arranged in adjustment chambers, said actuators being configured to move in a radial direction to adjust the flow rate of a cooling fluid moving through the adjustment chambers towards a forming cone,
    a plurality of heating elements equally spaced around the ring and arranged in said adjustment chambers,
    wherein said actuators and said heating elements are sequentially arranged in the path of the cooling flow through the adjustment chambers.

2. Device according to claim 1, wherein the heating elements are arranged between entrance holes of the adjustment chambers and the actuators.

3. Device according to claim 1, wherein the heating elements are arranged between the actuators and channels that lead the flow from the adjustment chambers to the forming cone.

4. Device according to claim 3, wherein the heating elements are present in a number greater than the actuators.

5. Device according to claim 4, wherein said heating elements are present in a number twice than the actuators.

6. Device according to claim 3, wherein the actuators consist of sliding shutters that are driven by electric motors.

7. Device according to claim 6, wherein the electric motors are stepping motors.

8. Device according to claim 6, wherein the sliding shutters are arranged horizontally and move in the radial direction.

9. Device according to claim 3, wherein the heating elements consist of cartridge resistances provided with finned dissipators.

10. Device according to claim 1, wherein the heating elements are present in a number greater than the actuators.

11. Device according to claim 10, wherein the actuators consist of sliding shutters that are driven by electric motors.

12. Device according to claim 11, wherein the electric motors are stepping motors.

13. Device according to claim 11, wherein the sliding shutters are arranged horizontally and move in the radial direction.

14. Device according to claim 10, wherein said heating elements are present in a number twice than the actuators.

15. Device according to claim 1, wherein the actuators consist of sliding shutters that are driven by electric motors.

16. Device according to claim 15, wherein the sliding shutters are arranged horizontally and move in the radial direction.

17. Device according to claim 1, wherein the heating elements consist of cartridge resistances provided with finned dissipators.

18. Device according to claim 15, wherein said electric motors are stepping motors.

19. Method for the adjustment of the thickness profile of blown films at the cooling ring of an apparatus for the production of blown films, comprising:
  a) arranging in said cooling ring (i) a device for the adjustment of the flow rate of the cooling flow comprising a plurality of actuators equally spaced around the cooling ring and arranged in adjustment chambers, said actuators being configured to move in a radial direction and being located in the path of the cooling flow through said adjustment chambers, and (ii) heating elements located in the path of the cooling flow through the adjustment chambers and sequentially arranged with said actuators;
  b) setting the range of the flow rate adjustment of said device so that the reference temperature of the film corresponds to a flow rate of the cooling flow such that at the maximum flow rate there is no bubble instability and at the minimum flow rate there is no adhesion of the film to the forming cone;
  c) adjusting the thickness profile of the film, on the basis of the values detected by suitable sensors, by changing only the flow rate of the cooling flow within the adjustment range set in the previous step; and
  d) increasing the flow temperature by means of the heating elements in order to reduce the film thickness only in case it must reach values below the thickness corresponding to the minimum flow rate of the cooling flow.

20. Method according to claim 19, wherein in case the number of heating elements arranged in step a) is greater than the number of actuators that adjust the flow rate of the cooling flow, step d) can be carried out also in case of need of a higher adjustment resolution.

\* \* \* \* \*